United States Patent Office 3,477,471
Patented Nov. 11, 1969

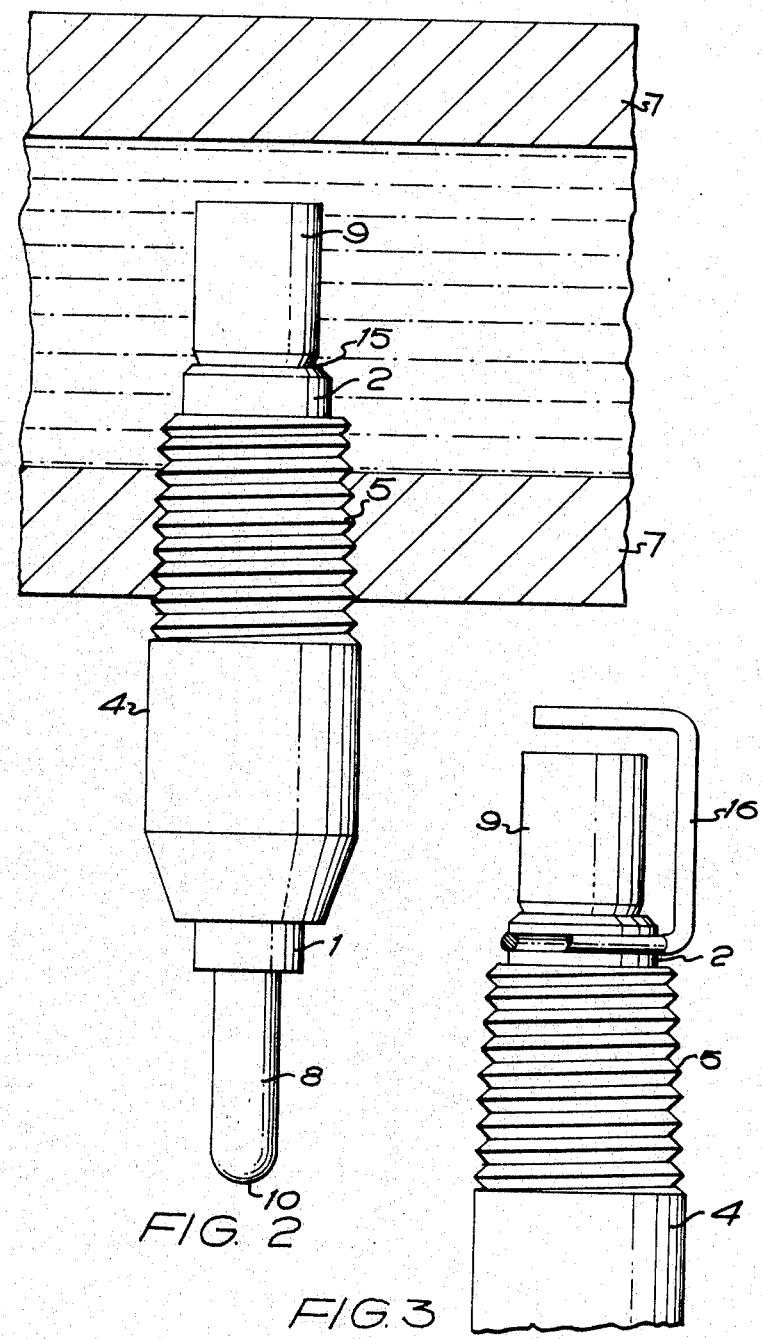

3,477,471
VALVES FOR CONTROLLING THE SUPPLY OF DRINKING WATER TO POULTRY OR OTHER LIVESTOCK
Ronald I. Mallinson, Marten, Kebroyd, Triangle, near Halifax, Yorkshire, England
Filed Dec. 11, 1967, Ser. No. 689,480
Claims priority, application Great Britain, Feb. 7, 1967, 5,684/67
Int. Cl. F17d *3/00;* A01k *7/02;* F16k *51/00*
U.S. Cl. 137—614.18                              4 Claims

ABSTRACT OF THE DISCLOSURE

Valve for supplying drinking water to poultry which comprises a plastic body with different diameter aligned bores in which metal tubes are located. The ends of the metal tubes serve as valve seats for two poppet valves which are serially arranged, there being a slight clearance between the end of the stem of one valve and the top of the adjacent valve which insures the seating of both valves. The stem of one of the poppet valves projects from the valve body and serves for the actuation of both valves.

---

This invention relates to valves for controlling the supply of drinking water to poultry and other livestock. Hitherto valves at present constructed have generally been made from stainless steel and have involved a considerable amount of machining which results in relatively high production costs which are reflected in the selling price of the valves.

The chief object of the present invention is to provide a new or improved method of constructing such valves which will result in a cheaper and easier made product without reducing its operating efficiency.

According to the invention the valve comprises a two-diameter tube or tubes around which is moulded a synthetic outer body portion being screw threaded on its outer surface or formed with other securing means whereby the valve can be held in its operating position. Any suitable form of valve member or members may be positioned in the bore of the two-diameter tube or tubes and the valve member or members may be either free or captive in the tube or tubes.

In order that the invention may be fully and clearly comprehended the same will now be described with reference to the accompanying drawings, wherein:

FIGURE 2 is an enlarged part sectional elevation showing the valve in position in a water supply pipe.

FIGURE 3 is an enlarged fragmentary section showing an alternative construction.

Figure 1:
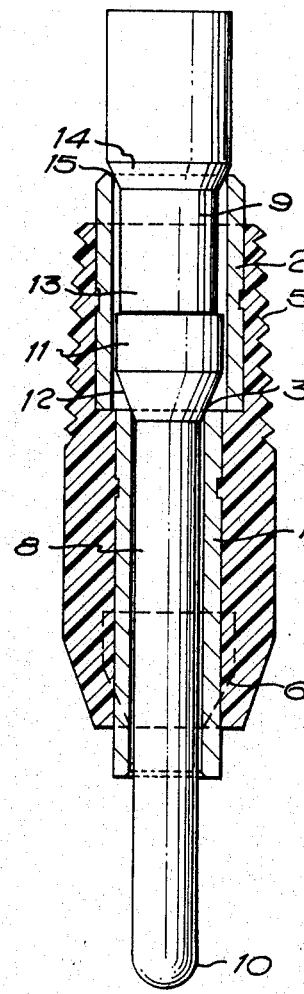
FIGURE 1 is an enlarged sectional elevation of one example of valve constructed in accordance with the invention.

Referring to the drawings, the valve comprises two tubes 1, 2 of stainless steel of different diameters and positioned in axial alignment.

If desired the tubes 1, 2 may be connected by welding (not shown) but if the end of the narrower bore tube constitutes the valve seat, as shown at 3 this must have a smooth finish, free from burrs and swarf.

Around the tubes is moulded a synthetic body portion 4 of polystyrene or similar plastics material. The moulded body portion is formed with a screw thread at 5, preferably ⅛″ B.S.P. Taper thread, whilst below the thread portion there are flats or notches 6 which may if desired be hexagonal to facilitate the screwing of the valve into the water pipe 7 see FIGURE 2 which feeds the valve.

The valve further comprises two poppet valves 8 and 9, the lower poppet valve 8 comprising a stem whose lower end 10 may be rounded and project from the valve body 4, and whose upper end is provided with an enlarged head 11 which includes a frustoconical shoulder 12 which normally rests upon the valve seat 3 of the narrower tube 1.

The upper poppet valve 9 of the valve consists of a similar stem having a lower end 13 which engages the top 11 of the lower part 8 and a frustoconical upper part 14 which seats on a valve seat 15 at the upper end of the larger diameter tube 2.

The upper poppet valve 9 will preferably be captive relative to the body of the valve, preferably by means of a wire or like 16 see FIGURE 3, connected to the body and passing over the end of the upper part. Alternatively the face of the pipe 7 into which the valve is mounted could act as the stop for the upper poppet valve (see FIGURE 2).

In operation the valve is screwed into a water supply pipe and in the event of the water supply pipe being one for a poultry battery, laying cage or the like, upward pressure by the beaks of poultry on the projecting lower valve parts cause drops of water to automatically exude from the valves for the poultry to drink.

I claim:
1. A valve for controlling the supply of drinking water to poultry and other live stock comprising a plastic body, axially aligned upper and lower bores of different diameters within said body, an upper and lower tube within said respective upper and lower bores bonded to the body, the upper end of each tube forming a valve seat, a poppet valve seating on the upper end of said upper tube with its stem extending into said upper tube, a second poppet valve seating on the upper end of said lower tube with its stem extending into said lower tube and projecting from said body, each stem being of smaller diameter than that of its respective tube and there being a slight clearance between the top of said second poppet valve and end of the stem of the first poppet valve when both valves are seated upon their seats, activation of said projected stem moving both valves to an open position to permit a flow through said tubes to the outside of the body, and thread means located on the outer upper surface of said body for securing said valve to a water supply line.

2. A valve for controlling the supply of drinking water to poultry and other live stock as claimed in claim 1, wherein means secured to the body is provided to limit the movement of said first poppet valve away from its seat.

3. A valve for controlling the supply of drinking water to poultry and other live stock as claimed in claim 1, wherein the body is screwed within a wall of a pipe and the movement of said first poppet valve is limited by the pipe wall opposite thereto.

4. A valve for controlling the supply of drinking water to poultry and other live stock as claimed in claim 2, wherein said last claimed means comprises a rod means secured to the body and having a portion in the path of movement of said poppet valve.

References Cited
UNITED STATES PATENTS

| | | | |
|---|---|---|---|
| 304,610 | 9/1884 | Cabell | 137—614.14 |
| 2,299,068 | 10/1942 | Gora | 251—366 X |
| 2,307,220 | 1/1943 | Hewitt | 251—339 X |
| 2,628,062 | 2/1953 | Weber | 251—368 X |
| 2,654,395 | 9/1953 | Kaye | 251—368 X |
| 2,710,594 | 6/1955 | Thompson | 251—339 X |
| 2,851,007 | 9/1958 | Kagan | 251—339 X |

ARNOLD ROSENTHAL, Primary Examiner

U.S. Cl. X.R.

119—72.5; 251—145, 366, 284